J. ENOS.
Car-Couplings.
No. 150,309. Patented April 28, 1874.
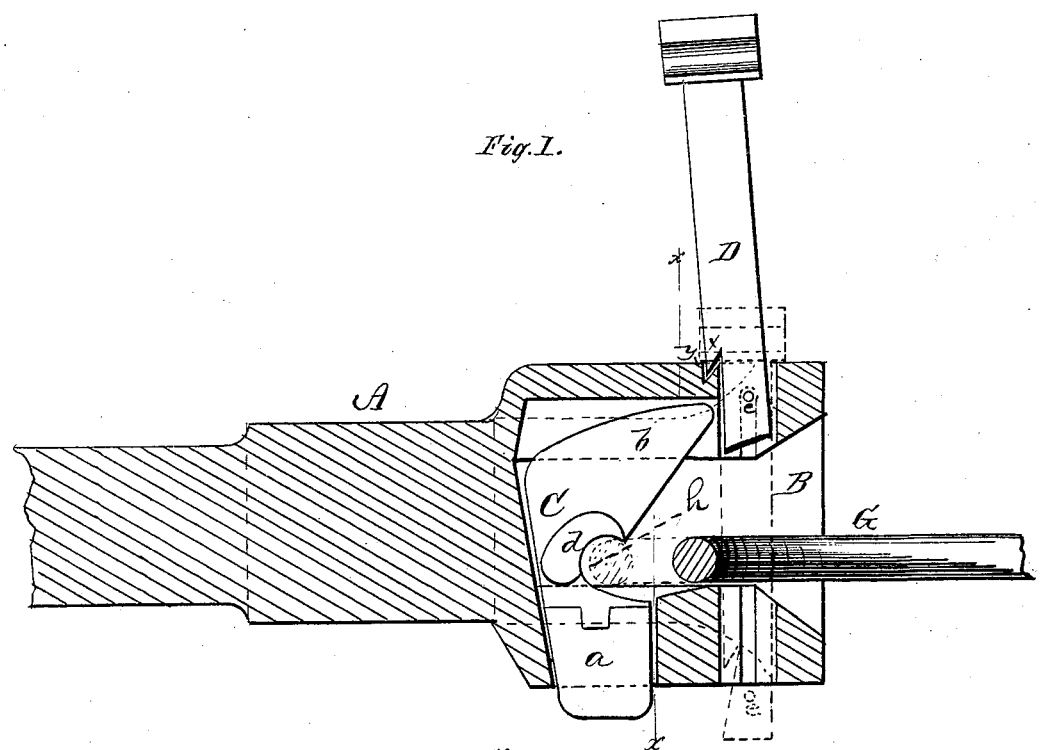
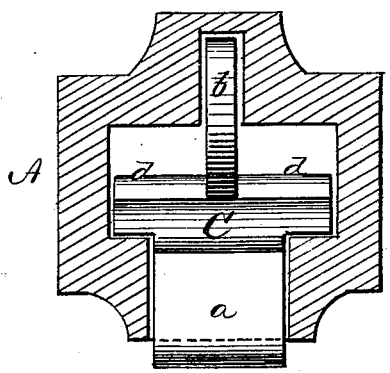
WITNESSES.
INVENTOR.
Joab Enos,
per C. H. Watson & Co
ATTORNEYS.

UNITED STATES PATENT OFFICE.

JOAB ENOS, OF ST. JOSEPH, MICHIGAN.

IMPROVEMENT IN CAR-COUPLINGS.

Specification forming part of Letters Patent No. 150,309, dated April 28, 1874; application filed February 24, 1874.

*To all whom it may concern:*

Be it known that I, JOAB ENOS, of St. Joseph, in the county of Berrien and State of Michigan, have invented certain new and useful Improvements in Car-Coupling; and I do hereby declare that the following is a full, clear, and exact description thereof, reference being had to the accompanying drawings, and to the letters of reference marked thereon, which form a part of this specification.

The nature of my invention consists in the construction and arrangement of a car-coupling, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my car-coupling; and Fig. 2 is a transverse vertical section of the same through the line line $x\ x$, Fig. 1.

A represents the bumper or draw-head, provided with the usual flaring mouth B, and an interior chamber. Inside of this chamber is placed a toggle, C, constructed as shown in the drawing, with a heavy lower end, $a$, which passes down through a beveled or inclined aperture in the bottom of the draw-head. The upper end $b$ of the toggle is somewhat in the shape of a hook-bill; and on the sides of the toggle are arms $d\ d$, to rest on shoulders within the draw-head. The front side of the toggle, at and below the arms, is rounded in concave form, as shown in Fig. 1, thus forming a pocket, $h$, for the link G, which may rise and fall to accommodate itself to the motion of the link when the cars are in motion, as the toggle has no pivot at all, and free to rise and fall while being held in an upright position by the weighted portion $a$ in the lower portion of the draw-head. D represents the coupling-pin, which is made square, with a suitable head to prevent it from falling through the draw-head. Through the lower end of the pin D passes a small transverse pin, $e$, which fits in grooves $i$ made in the sides of the holes in the draw-head. In the upper part of the draw-head these grooves do not extend clear to the top, but form stops for the pin $e$, so as to prevent the coupling-pin from being entirely withdrawn from the draw-head, and thus lessen the liability of losing the same. G represents the ordinary coupling-link. When the link is withdrawn and the coupling-pin D raised to a proper height, the toggle will drop forward, so that the point of the hook-bill $b$ will be under the lower end of the coupling-pin, which may thus rest on the same. As the link G enters the draw-head it strikes the toggles on the under side of the arms $d\ d$, forcing the toggle backward and upward. The backward movement releases the coupling-pin D, which will then drop down and couple the coupling. The upward movement allows the inner end of the link to enter the concavity in the toggle. The toggle will then hold the link in a horizontal position, and at the same time allow the link to move freely in any direction, if necessary. On the side of the coupling-pin D is formed a hook, $x$, to catch in a notch, $y$, on the upper surface of the draw-head, to support the pin when the cars are uncoupled and not ready to be coupled. When the cars are to be coupled, the pin is simply lifted off, when it will rest on the toggle, as above described.

I am aware that toggles have been used, pivoted to the draw-head; also made slotted and held in position by a transverse pin, and also the bottom of the toggle slotted or made open on the bottom and resting upon a pin. I am also aware of Patent 95,652; and I do not therefore claim such devices, the objects of my invention being to dispense with the pin and simplify the construction.

Having thus fully described my invention, what I claim as new, and desire to secure by Letters Patent, is—

The draw-head A, having the upper slotted portion to receive and guide the arm $b$, and inclined lower portion to receive the parts $a$ and the notch $y$; toggle C, having arms $d$, pockets $h$, and parts $a\ b$; and the pin D, having hook $x$ and pin $e$, all constructed and combined as and for the purpose specified.

In testimony that I claim the foregoing as my own I affix my signature in presence of two witnesses.

JOAB ENOS.

Witnesses:
 LENUS F. WARREN,
 GEORGE H. MURDOCH.